United States Patent [19]
Brown et al.

[11] Patent Number: 5,870,695
[45] Date of Patent: Feb. 9, 1999

[54] DIFFERENTIAL PRESSURE MEASUREMENT ARRANGEMENT UTILIZING REMOTE SENSOR UNITS

[75] Inventors: Gregory C. Brown, Minnetonka; David A. Broden, Minnetrista, both of Minn.

[73] Assignee: Rosemount Inc., Eden Prairie, Minn.

[21] Appl. No.: 804,613

[22] Filed: Feb. 24, 1997

Related U.S. Application Data

[63] Continuation-in-part of Ser. No. 258,262, Jun. 9, 1994, Pat. No. 5,606,513, which is a continuation-in-part of Ser. No. 124,246, Sep. 20, 1993, abandoned.

[51] Int. Cl.$^6$ ................................................ G01L 7/00
[52] U.S. Cl. ............................................ 702/138; 702/155
[58] Field of Search ................................ 364/574, 572, 364/558, 156, 571.04, 492, 510, 506; 702/45, 47, 50, 55, 138

[56] References Cited

U.S. PATENT DOCUMENTS

| | | | |
|---|---|---|---|
| 3,701,280 | 10/1972 | Stroman | 73/194 |
| 4,238,825 | 12/1980 | Geery | 364/510 |
| 4,414,634 | 11/1983 | Louis et al. | 364/510 |
| 4,419,898 | 12/1983 | Zanker et al. | 73/861.02 |
| 4,446,730 | 5/1984 | Smith | 73/301 |
| 4,485,673 | 12/1984 | Stern | 73/304 |
| 4,528,855 | 7/1985 | Singh | 73/721 |
| 4,562,744 | 1/1986 | Hall et al. | 73/861.02 |
| 4,598,381 | 7/1986 | Cucci | 364/558 |
| 4,602,344 | 7/1986 | Feretti et al. | 364/509 |
| 4,677,841 | 7/1987 | Kennedy | 73/30 |
| 4,825,704 | 5/1989 | Aoshima et al. | 73/861.42 |
| 4,881,412 | 11/1989 | Northedge | 73/861.04 |
| 4,958,938 | 9/1990 | Schwartz et al. | 374/208 |
| 5,035,140 | 7/1991 | Daniels et al. | 73/290 |
| 5,058,437 | 10/1991 | Chaumont et al. | 73/861.21 |
| 5,227,782 | 7/1993 | Nelson | 340/870.11 |
| 5,381,355 | 1/1995 | Birangi et al. | 364/602 |
| 5,606,513 | 2/1997 | Louwagie et al. | 364/506 |

FOREIGN PATENT DOCUMENTS

| | | |
|---|---|---|
| 0 063 685 A1 | 11/1982 | European Pat. Off. . |
| 0 214 801 A1 | 3/1987 | European Pat. Off. . |
| 0 223 300 A2 | 5/1987 | European Pat. Off. . |
| 91 09 176.4 | 10/1991 | Germany . |
| WO 88/01417 | 2/1988 | WIPO . |
| WO 89/02578 | 3/1989 | WIPO . |
| WO 89/04089 | 5/1989 | WIPO . |
| WO 90/15975 | 12/1990 | WIPO . |
| WO 91/18266 | 11/1991 | WIPO . |

OTHER PUBLICATIONS

"Single Chip Senses Pressure and Temperature," *Machine Design*, 64 (1992) May 21, No. 10.

Brochure: "Reduce Unaccounted–For Natural Gas with High–Accuracy Pressure Transmitters," Rosemount Inc. Measurement Division, Eden Prairie, Minnesota, ADS 3073, May 1991, pp. 1–4.

Technical Information Bulletin, "Liquid Level Transmitter Model DB40RL Sanitary Sensor deltapilot," Endress + Hauser, Greenwood, Indiana, Sep. 1992, pp. 1–8.

"The Digitisation of Field Instruments" W. Van Der Bijl, *Journal A*, vol. 32, No. 3, 1991, pp. 62–65.

Specification Summary, "Teletrans™3508–30A Smart Differential Pressure Transmitter," (undated) Bristol Babcock, Inc., Watertown, CT, 06795.

(List continued on next page.)

*Primary Examiner*—Louis M. Arana
*Assistant Examiner*—Craig Steven Miller
*Attorney, Agent, or Firm*—Westman, Champlin & Kelly, P. A.

[57] ABSTRACT

A master transmitter couples to first and second slave units through a bus. The slave units provide outputs to the bus related to first and second pressures of a process. The bus provides power to the units and carries signals. The master transmitter is adapted to couple to a two-wire process control loop which wholly powers the system.

43 Claims, 8 Drawing Sheets

OTHER PUBLICATIONS

Specification Summary, "Teletrans™3508–10A Smart Pressure Transmitter," (undated) Bristol Babcock, Inc., Watertown, CT, 06795.

Specification Summary, "AccuRate Advanced Gas Flow Computer, Model GFC 3308," (undated) Bristol Babcock, Inc., Watertown, CT, 06795.

Product Data Sheet PDS 4640, "Model 3201 Hydrostatic Interface Unit," Mar. 1992, Rosemount Inc., Eden Prairie, MN 55344.

Product Data Sheet PDS 4638, "Model 3001CL Flush–Mount Hydrostatic Pressure Transmitter," Jul. 1992, Rosemount Inc., Eden Prairie, MN 55344.

"Flow Measurement," *Handbook of Fluid Dynamics,* V. Streeter, Editor–in–chief published by McGraw–Hill Book Company, Inc. 1961, pp. 14–4 to 14–15.

"Precise Computerized In–Line Compressible Flow Metering," *Flow—Its Measurement and Control in Science in Science and Industry,* vol. 1, Part 2, Edited by R. Wendt, Jr., Published by American Institute of Physics et al, (undated) pp. 539–540.

"A Systems Approach," Dr. C. Ikoku, *Natural Gas Enginnering,* PennWell Books, (undated) pp. 256–257.

"Methods for Volume Measurement Using Tank–Guaging Devices Can Be Error Prone," F. Berto, *The Advantages of Hydrostatic Tank Guaging Systems,* undated reprint from *Oil & Gas Journal* .

"Hydrostatic Tank Guaging—Technology Whose Time Has Come," J. Berto, *Rosemount Measurement Division Product Feature,* undated reprint *INTECH* .

"Pressure Sensors Guage Tank Level and Fluid Density," *Rosemount Measurement Division Product Feature,* undated reprint from *Prepared Foods* (Copyright 1991 by Gorman Publishing Company).

"Low Cost Publishing Electronic Flow Measurement System," *Tech Profile,* May 1993, Gas Research Institute, Chicago, IL.

"Development of an Integrated EFM Device for Orifice Meter Custody Transfer Applications," S.D. Nieberle et al., *American Gas Association Distribution/Transmission Conference & Exhibit,* May 19, 1993.

Advertisement, AccuRate Model 3308 Integral Smart DP/P/T Transmitter, (undated) Bristol Babcock, Inc., Waterown, CT 06795.

Advertisement, Model 3508 Transmitter, *Control Engineering,* Dec. 1992, Bristol Babcock, Inc., Watertown, CT 06795.

"Smart Transmitters Tear Up The Market," C. Polsonetti, *Intech,* Jul. 1993, pp. 42–45.

DIFFERENTIAL PRESSURE MEASUREMENT ARRANGEMENT UTILIZING REMOTE SENSOR UNITS

RELATED APPLICATION

This application is a continuation-in-part of U.S. patent application Ser. No. 08/258,262, "Transmitter Having Input For Receiving A Process Variable From A Remote Sensor", filed Jun. 9, 1994 now U.S. Pat. No. 5,606,513, which is hereby incorporated by reference, which is a continuation-in-part of U.S. patent application Ser. No. 08/124,246, "Multivariable Transmitter", filed Sep. 20, 1993, now abandoned.

BACKGROUND OF THE INVENTION

The present invention relates to pressure measurement devices, and particularly to pressure transmitter systems that respond to pressure at two discrete locations and that communicate with a separate controller over a two-wire link.

Pressure transmitters having a transmitter housing that includes a differential pressure ("$\Delta P$") transducer fluidically coupled to two pressure ports in the housing, are known. Such transmitters further include circuitry in the transmitter housing coupled to the transducer and communicating the measured $\Delta P$ or a related process variable such as flow or level, to a distant controller over a two-wire link. The controller energizes the circuitry over the two-wire link.

In some applications, such as level measurement, it is desired to measure differential process fluid pressure at locations separated from each other by a distance much greater than the scale size of the transmitter housing. To make such a measurement it is known to attach to the above described $\Delta P$ transmitter flexible oil-filled capillary tubes or impulse piping to fluidically transmit the process fluid pressures to the housing pressure ports. However, such arrangements suffer from errors due to differences in height and temperature of the oil-filled capillary tubes. Flow measurements can also be computed using the same architecture. For example, the pressure differential across an orifice plate can be measured with the pressure transmitters and used to calculate flow in accordance with known techniques.

It is also known to provide a separate pressure transmitter at each of the two process fluid measurement locations, and to electrically couple each of the pressure transmitters to a "hydrostatic interface unit" (HIU). The HIU communicates with the distant controller over a two-wire link, and is wholly powered by a separate unit over a different electrical link. The HIU, in turn, electrically powers and communicates with the pressure transmitters, and performs multiple arithmetic operations on the measured pressures. For example, where the pressure transmitters are mounted on a storage tank of process fluid, the HIU can communicate over the two-wire link a 4–20 mA signal indicative of the process fluid density $\rho$:

$$\rho = \Delta P \times \left( \frac{1}{z \times g} \right),$$

where $\Delta P$ is the process fluid pressure difference between the transmitters, g is gravitational acceleration, and z is the (user-programmed) vertical separation of the fluid measurement locations. This system avoids problems associated with oil-filled capillaries external to the transmitter housing, but has disadvantages of its own such as the need to mount additional electronic transmitters proximate the measurement site and the need for a separate power supply for the HIU due in part to the large number of calculations performed by the HIU and the requirement that it powers the transmitters.

SUMMARY OF THE INVENTION

The invention includes a process variable measurement system having a master transmitter unit having a non-fluidic connection through a bus to at least two remote pressure sensor units adapted to couple to a tank, or other process container or conduit for example. The process variable is related to a differential pressure. Transmitter circuitry in the master transmitter receives non-fluidic process variable signals related to pressures at the at least two remote pressure sensor modules and responsively calculates level of the process fluid in the tank or flows through a conduit. The transmitter circuitry is adapted to couple a transmitter signal related level to a two-wire process control loop. Another aspect of the invention includes providing a local output related to the pressure signals. The master transmitter and sensor units are completely powered from power received on the two-wire process control loop.

BRIEF DESCRIPTION OF THE DRAWINGS

For brevity and ease of discussion, items in some figures bear the same reference numeral as items in earlier figures. Such items bearing the same reference numeral serve the same or similar function.

DETAILED DESCRIPTION OF THE PREFERRED EMBODIMENTS

Figure 1:
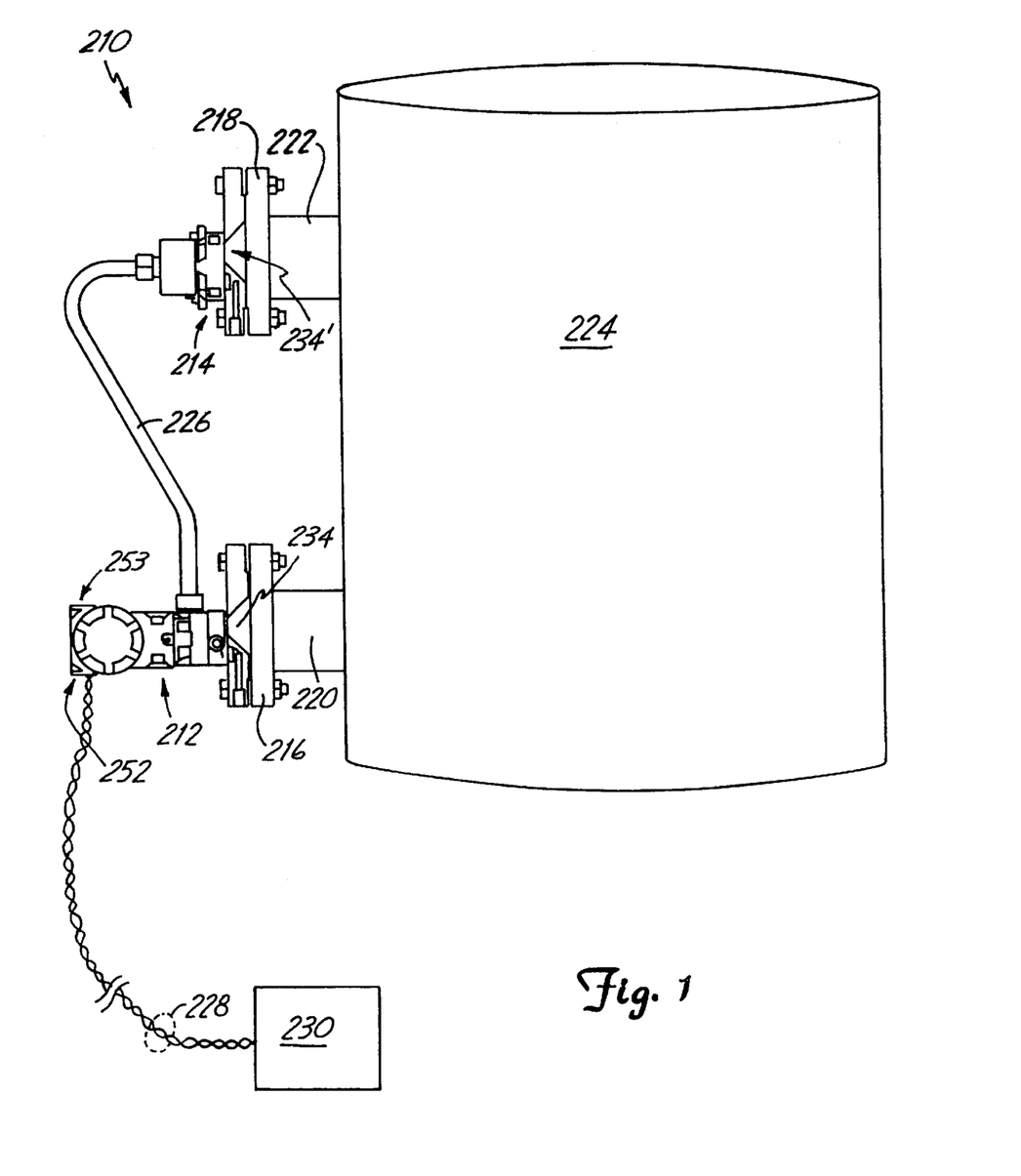
FIG. 1 is an elevational view of an arrangement for measuring level differential pressure in accordance with the invention.

In FIG. 1, differential pressure measurement system 210 includes a "master" pressure transmitter unit 212 and a "slave" unit 214 which units 212,214 bolt to flanges 216, 218, respectively, at ports 220,222 on storage tank 224. Tank 224 holds a process fluid (not shown). System 210 measures a hydrostatic pressure differential of the process fluid between ports 220,222. The distance between ports 220,222 is on the order of or greater than the size of one of the units 212,214, such that the measurement cannot be made with a single transmitter unless oil-filled capillary tube extensions or impulse piping are used. Each of the units 212,214 includes a pressure transducer and, preferably, preconditioning electronics to provide an electrical output indicative of the process fluid pressure at the respective port 220,222. Units 212,214 can measure an absolute pressure, a differential pressure, or (as shown) a gauge pressure of the process fluid at the respective ports 220,222, but preferably they make the same type of measurement to reduce atmospheric pressure effects.

Slave unit 214 conveys to master transmitter unit 212 an electrical representation of the process fluid pressure at port 222 via electrical connection 226. Connection 226 is preferably a two-wire connection and can comprise a shielded cable with standard electrical connectors affixed at both ends, or it can comprise bendable tubular conduit with wires running therethrough. Such conduit protects and, if it is electrically conductive, electrically shields the wires from electromagnetic interference.

Master transmitter unit 212, in addition to measuring the process fluid pressure at port 220, calculates a process fluid pressure difference between ports 220 and 222 by calculating a difference between the pressure measurements made by units 212,214. If pressure units 212,214 are configured for gauge pressure measurement, the computed difference between their outputs will include a contribution due to the atmospheric pressure difference between the two pressure transmitter locations. This atmospheric contribution can be corrected for by an offset adjustment within master transmitter unit 212, or, depending upon desired system accuracy and vertical separation of units 212,214, can be ignored.

Control system 230 sends commands to and receives signals from master transmitter unit 212 over two-wire link 228 (for example, in a HART® format, available from Rosemount Inc., Eden Prairie, Minn., USA), and master transmitter unit 212 communicates with slave unit 214. Control system 230 energizes master transmitter unit 212 over link 228, and master transmitter unit 212 in turn energizes slave unit 214 over connection 226. Preferably, master transmitter unit 212 adjusts the electrical current flowing through link 228 between 4 mA and 20 mA as an indication of the calculated process fluid pressure difference. As another example, link 228 can carry Fieldbus or HART® signals.

Figure 2:
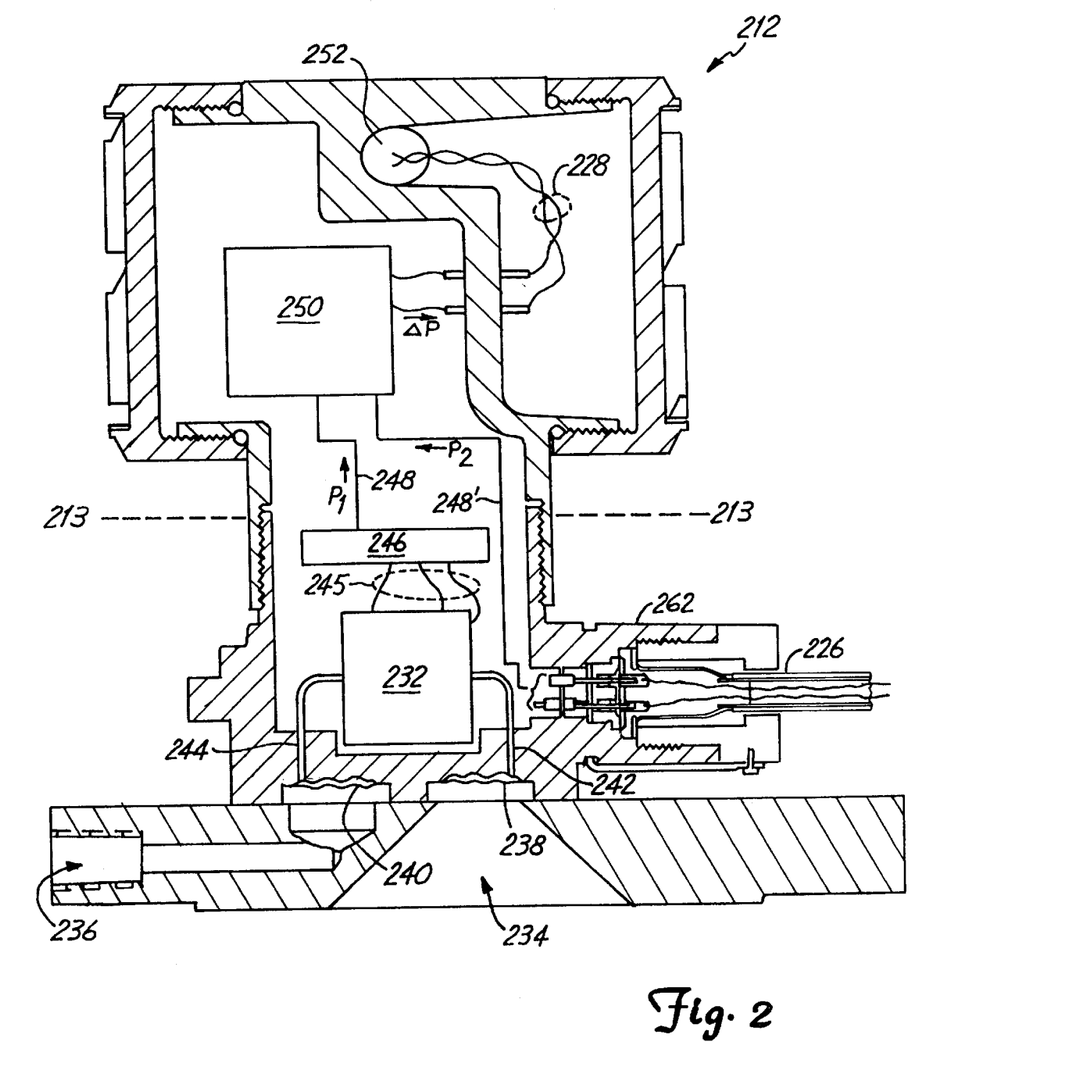
FIG. 2 is a sectional view, partially in block diagram, of a master pressure transmitter in accordance with the invention.

Master pressure transmitter unit 212 is shown in greater detail in FIG. 2. For clarity, the portion of the transmitter housing above line 213—213 is shown rotated 90° relative to transmitter housing portions below line 213—213. Pressure transducer 232, preferably a strain gauge type sensor (not shown) including a temperature sensor which senses temperature of the strain gauge for temperature compensating and responds to a difference in pressure between process fluid at pressure port 234 and ambient air at pressure port 236. As shown, transducer 232 couples to the pressure ports via isolator diaphragms 238,240 and passageways 242,244 filled with, for example, silicone oil. Other isolator configurations, such as using a second isolator diaphragm may also be used. Pressure transducer 232 can alternately measure absolute pressure of process fluid at port 234, in which case port 236, diaphragm 240, and passageway 244 can be eliminated. Measurement circuitry 246 couples to transducer 232 by wires 245, and provides a first pressure output $P_1$ on link 248 responsive to the relative or absolute pressure at port 234. Link 248, and other electrical connections in the figures, are drawn with a thickened line to make it clear that they can comprise multiple independent conductors. Preferably, circuitry 246 includes a thermistor or other temperature sensor, which is in close thermal communication with transducer 232 and which is used to compensate for thermal characteristics of transducer 232.

Advantageously, master transmitter unit 212 includes $\Delta P$ calculation circuitry 250 which receives the first pressure output $P_1$ over link 248 and a second pressure output $P_2$ over link 248', and calculates therefrom the pressure difference $\Delta P = P_2 - P_1$. Measurement $P_2$ is indicative of the relative or absolute pressure at port 234', and, like $P_1$, is temperature compensated. Circuitry 250 then communicates the pressure difference $\Delta P$ over link 228 through communication port 252 in transmitter unit 212 housing to control unit 230. In the embodiment shown in FIGS. 1 and 2, $P_1$ and $P_2$ are themselves both differential pressure measurements since they are indicative of gauge pressure. Circuitry 250 also serves to power circuitry 246 over link 248 and corresponding circuitry 246' in slave unit 214 (see FIG. 5A) over link 248'. Use of the dual units 212,214 and inclusion of $\Delta P$ calculation circuitry 250 in master pressure transmitter unit 212 eliminates the need for external oil-filled capillaries, as well as the need for a separate computational unit or the need for control unit 230 to perform such calculations.

Figure 3A:
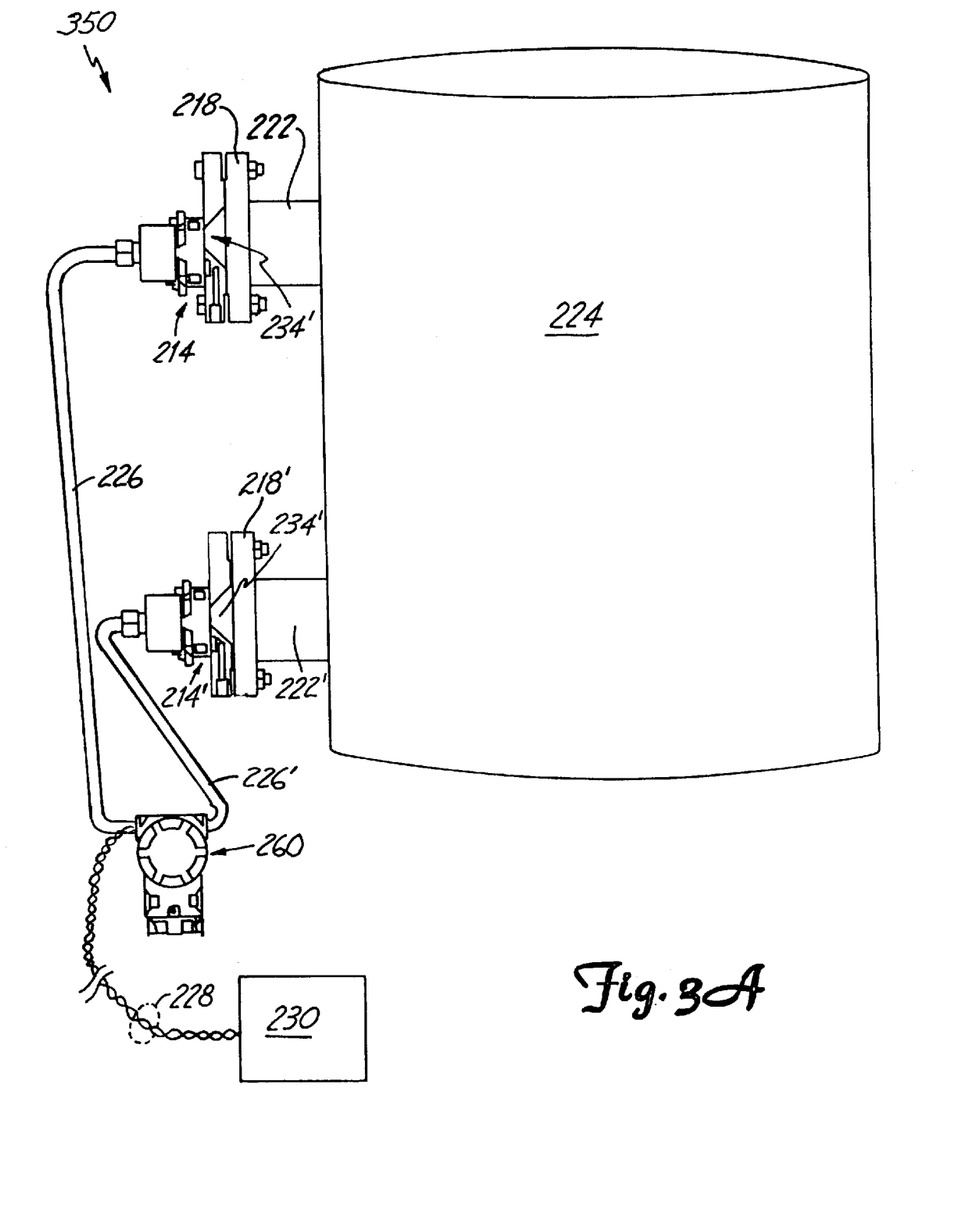
FIGS. 3A and 3B are elevational views of alternate measurement systems in accordance with the invention.
Figure 3B:
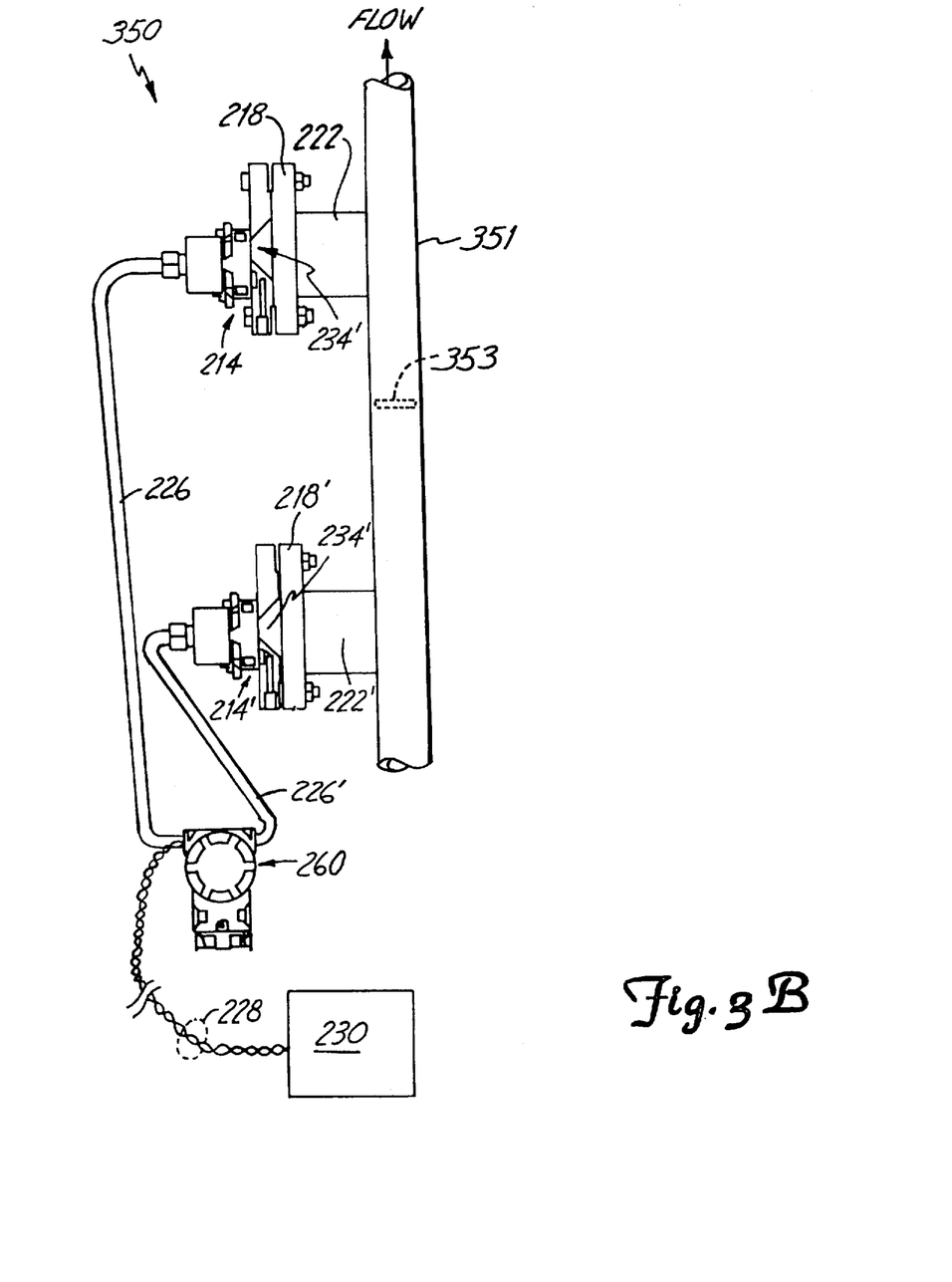

FIG. 3A shows a differential pressure measurement system 350 in accordance with another embodiment coupled to tank 224 to determine mess or level. FIG. 3B shows system 350 coupled to determine flow through conduit 351 by measuring a pressure differential across orifice plate 353. System 350 includes master transmitter unit 260 which couples to slave units 214 and 214' through conduits 226 and 226', respectively. Slave units 214, 214' are not transmitters. Instead, units 214, 214' are simplified units with limited functionality which allows reduced power requirements and lower manufacturing costs.

Figure 4:
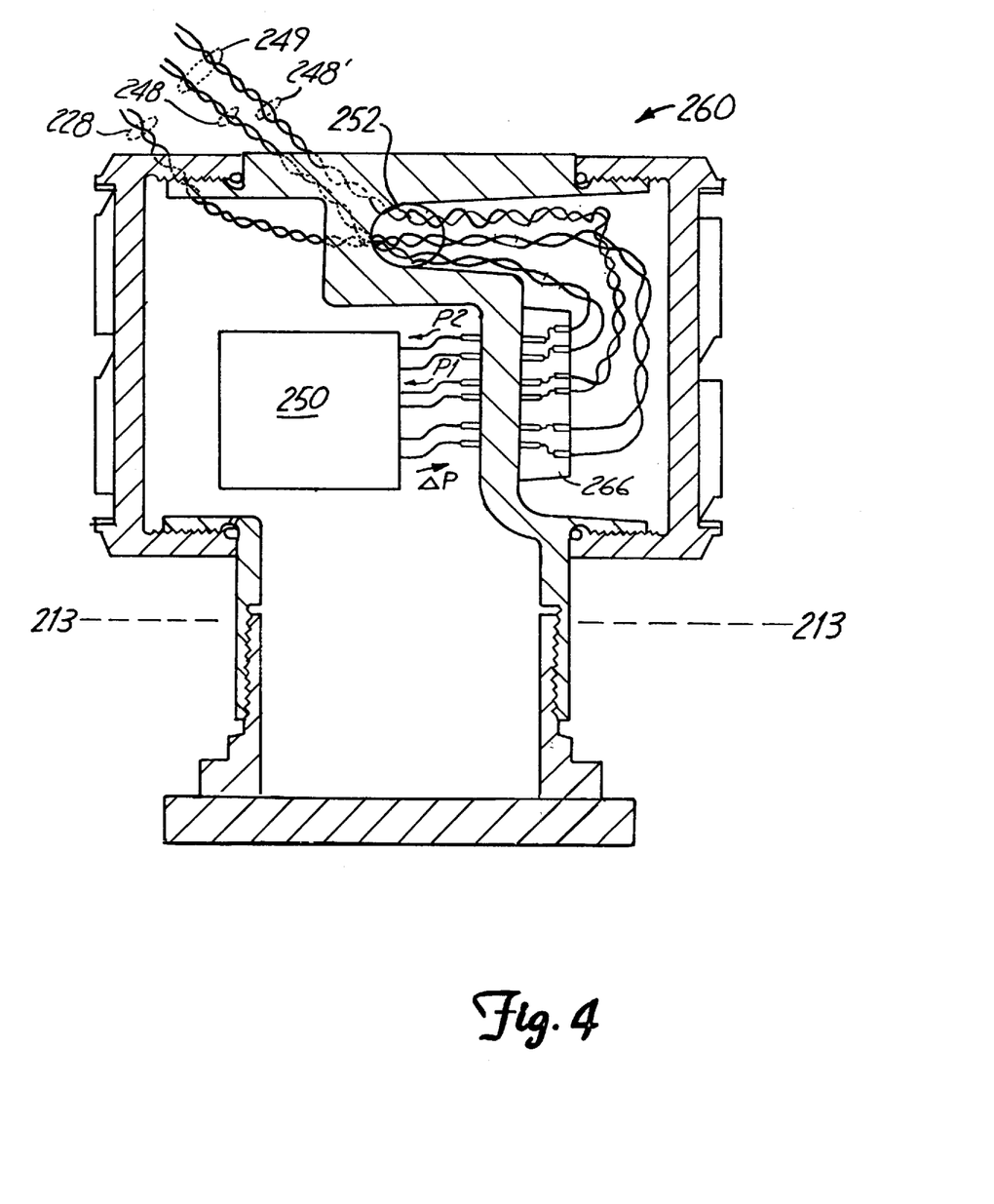
FIG. 4 is a sectional view of a master pressure transmitter in accordance with another embodiment.

FIG. 4 shows master pressure transmitter 260 of FIGS. 3A and 3B in greater detail. Master pressure transmitter 260 includes transmitter circuit 250 which receives two pressure signals, $P_1$ and $P_2$ from slave units 214 and 214' over a bus 249 which is formed by links 248 and 248'. Transmitter circuitry 250 calculates a process variable such as level related to the pressure differential which is transmitted over two-wire process control loop 228. Further, circuitry 250 provides power to units 214, 214' through link 249. The embodiments of FIGS. 3A, 3B and 4 are particularly advantageous because the majority of the electronics, and in particular electronics which may be sensitive to temperature or other environmental conditions, may be placed in master transmitter 260 at a location which is remote from tank 224. For example, if tank 224 carries a hot liquid or experiences large vibrations or shocks, only slave units 214 and 214' are directly coupled to tank 224 while master transmitter unit 260 may be placed a safe distance way. Furthermore, master transmitter unit 260 does not require a separate power supply and completely powers units 214 and 214' over link 249. Transmitter 260 is completely powered over two-wire process control loop 228 using power received from controller 230. Further, as bus 249 which interconnects transmitter 260 with units 214 and 214' provides a non-fluidic connection, improved accuracy is achieved over typical prior art systems which utilize fluid filled capillary tubes.

Figure 5A:
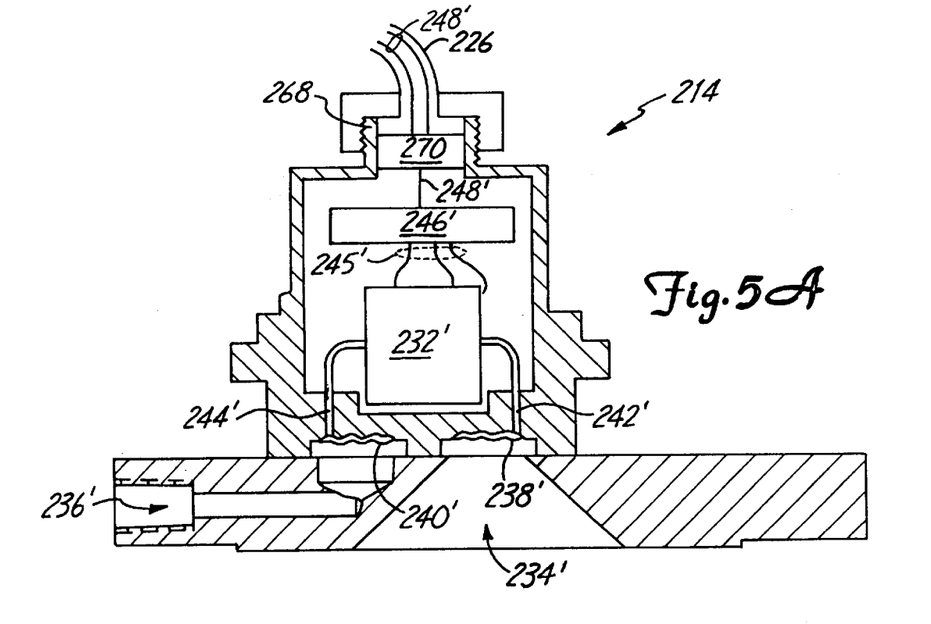
FIGS. 5A and 5B are sectional views, partially in block diagram, of slave pressure units in accordance with the invention.

FIG. 5A shows slave pressure unit 214 of FIGS. 1, 3A and 3B in greater detail. Primed reference numerals identify components having the same function as previously discussed components having corresponding unprimed reference numerals. Primes (') have been added to associate the numbered component with slave pressure unit 214. In one embodiment, slave unit 214 uses a pressure transmitter 232' and measurement circuitry 246' substantially the same as corresponding transmitter 232 and circuitry 246 of master transmitter unit 212 or 260. Connection 226 enters slave pressure unit 214 through a communication port 268. Connection 226 terminates in a multiple-pin connector affixed at its end, which reversibly joins to a mating member 270, thereby to complete the electrical link 248'.

Figure 5B:
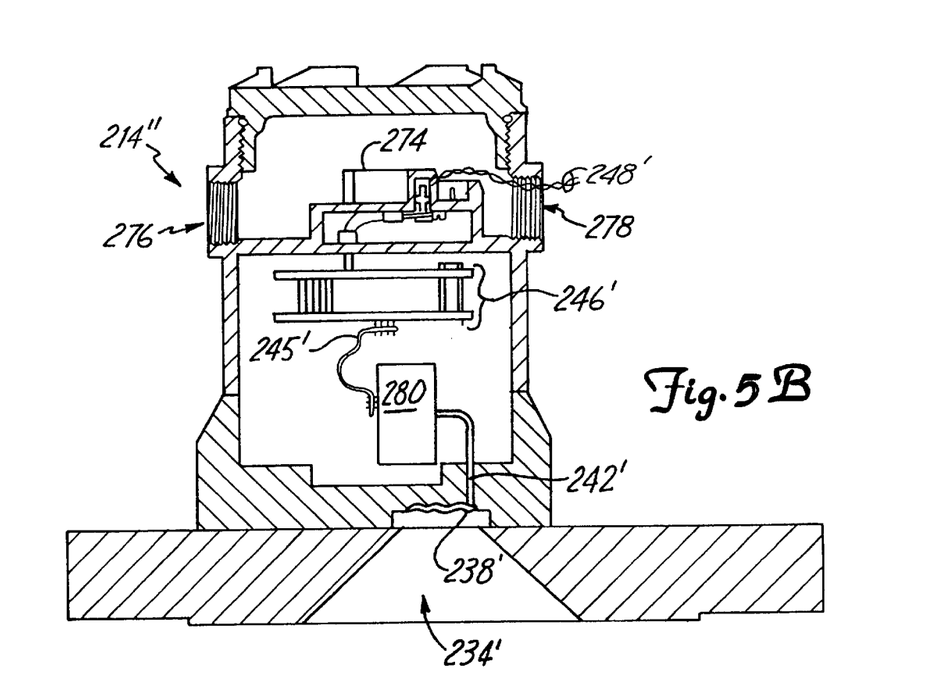

FIG. 5B shows an alternative slave unit 214" which uses a terminal block 274 and communication ports 276,278 in place of port 268 and mating member 270 from unit 214. Such substitution permits the customer to use standard metal conduit with feedthrough wires to connect the slave unit 214" to the master transmitter. Measurement circuitry 246', discussed above, is shown as a pair of circuit boards which couple to transducer 280 through ribbon cable 245'. Unit 214" comprises pressure transducer 280, which measures the absolute pressure of the process fluid at pressure port 234'.

Figure 6:
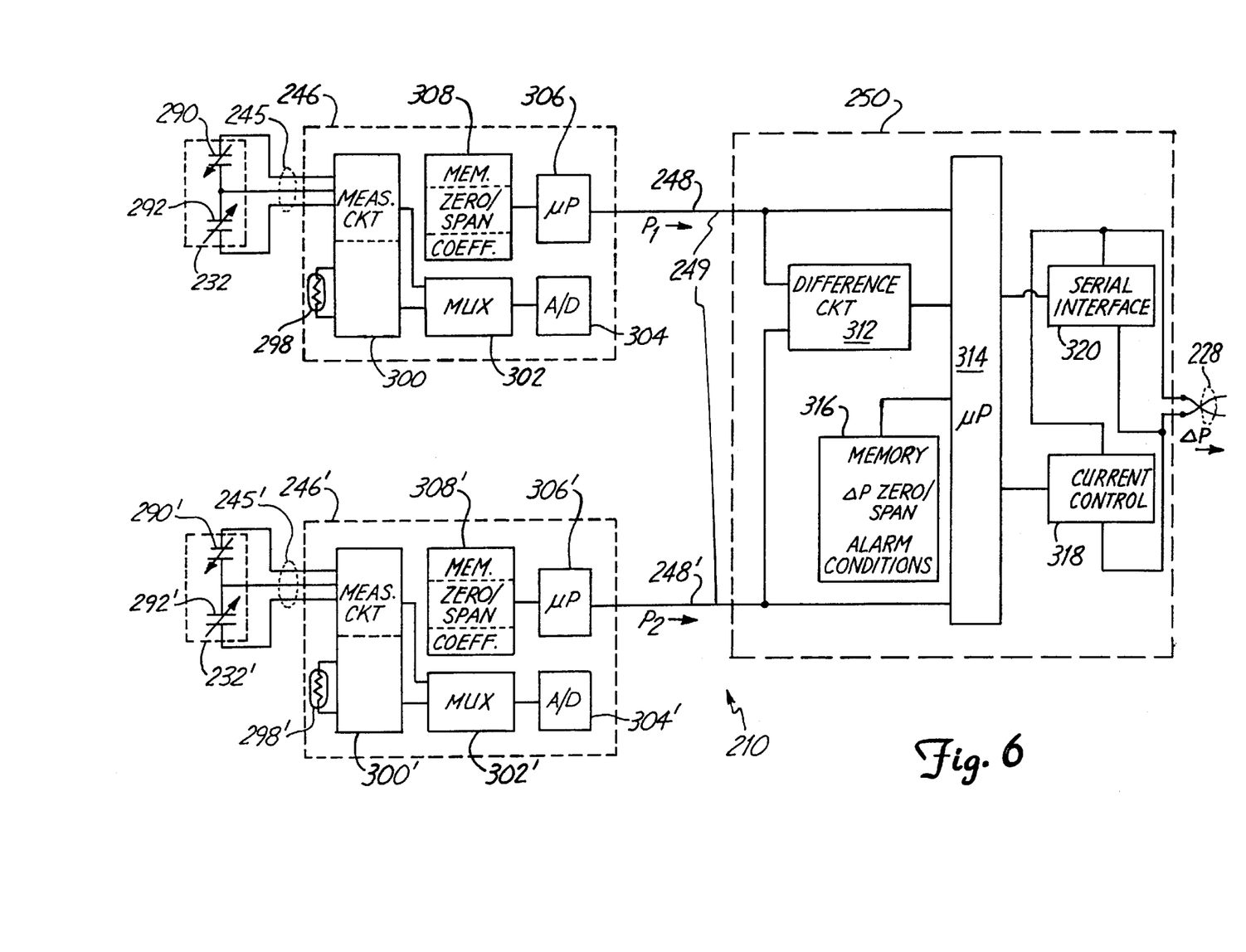
FIG. 6 is an electrical block diagram of the differential pressure measurement system of FIGS. 1 or 3.

FIG. 6 is an electrical block diagram of the differential pressure measurement system shown in FIGS. 1, 3A and 3B. In the embodiment of FIG. 6, circuitry 246, 246' includes a microprocessor 306, 306', however, another embodiment described below uses a programmable logic array. System 210 includes calculation circuitry 250 coupled to transducers 232 and 232'. FIG. 6 shows measurement circuitry 246 in more detail which couples a master transmitter 260 through bus 249 which is made up by connections 248 and 248'. Circuitry 246 and sensor 232 may be placed in master transmitter 212 (FIGS. 1 and 2) or in slave unit 214 (FIGS. 3A, 3B and 4). Circuitry 246 couples via lines 245 to capacitors 290 and 292 in transducer 232. Capacitors 290 and 292 can be configured to measure differential pressure. Circuitry 246 includes a resistance temperature device (RTD) 298 coupled to measurement input circuitry 300 which also couples to capacitors 290 and 292 of transducer 232. Analog-to-digital converter 304 selectively couples to transducer 232 or RTD 298 through multiplexer 302 and circuitry 300. Analog-to-digital converter 304 couples to microprocessor 306 which also connects to memory 308. Memory 308 contains various information including information regarding zero and span, and various coefficients for correction of, for example, nonlinearity of transducer 232 output with pressure and variation of transducer 232 output with temperature. Microprocessor 306 communicates with calculation circuitry 250 over line 248, providing a pressure output P1 as a function of transducer 232 output adjusted by the zero and span values and corrected by the correction coefficients together with the RTD 298 output. Circuitry 250 can program the contents of memory 308 over line 248.

Circuitry 250 includes difference circuit 312, microprocessor 314 and memory 316. Microprocessor 314 couples to circuitry 246 and 246', difference circuit 312, memory 316, current control 318, and serial interface 320. Difference circuit 312 also receives the outputs of 246 and 246' over bus 249. Microprocessor 314 communicates with circuitry 246, 246' through links 248,248' of bus 249. Microprocessor 314 controls microprocessor 306 to configure circuitry 246. Further, pressure information is provided directly to microprocessor 314 and pressure differential ΔP is provided to microprocessor 314 through difference circuit 312. Microprocessor 314 communicates over two-wire link 228 and controls the current flowing through loop 228 using current control circuitry 318 in response to measured pressure values. Serial interface 320 is used for digital communications over current loop 228.

Microprocessors 306 and 306' in circuitry 246 and 246', respectively, perform correction and compensation functions on the pressure sensed by sensors 232 and 232', respectively. Microprocessors 306,306' use correction coefficients stored in memory 308,308'. Thus, units 246,246' are easily interchangeable and can be individually calibrated during manufacture.

Figure 7:
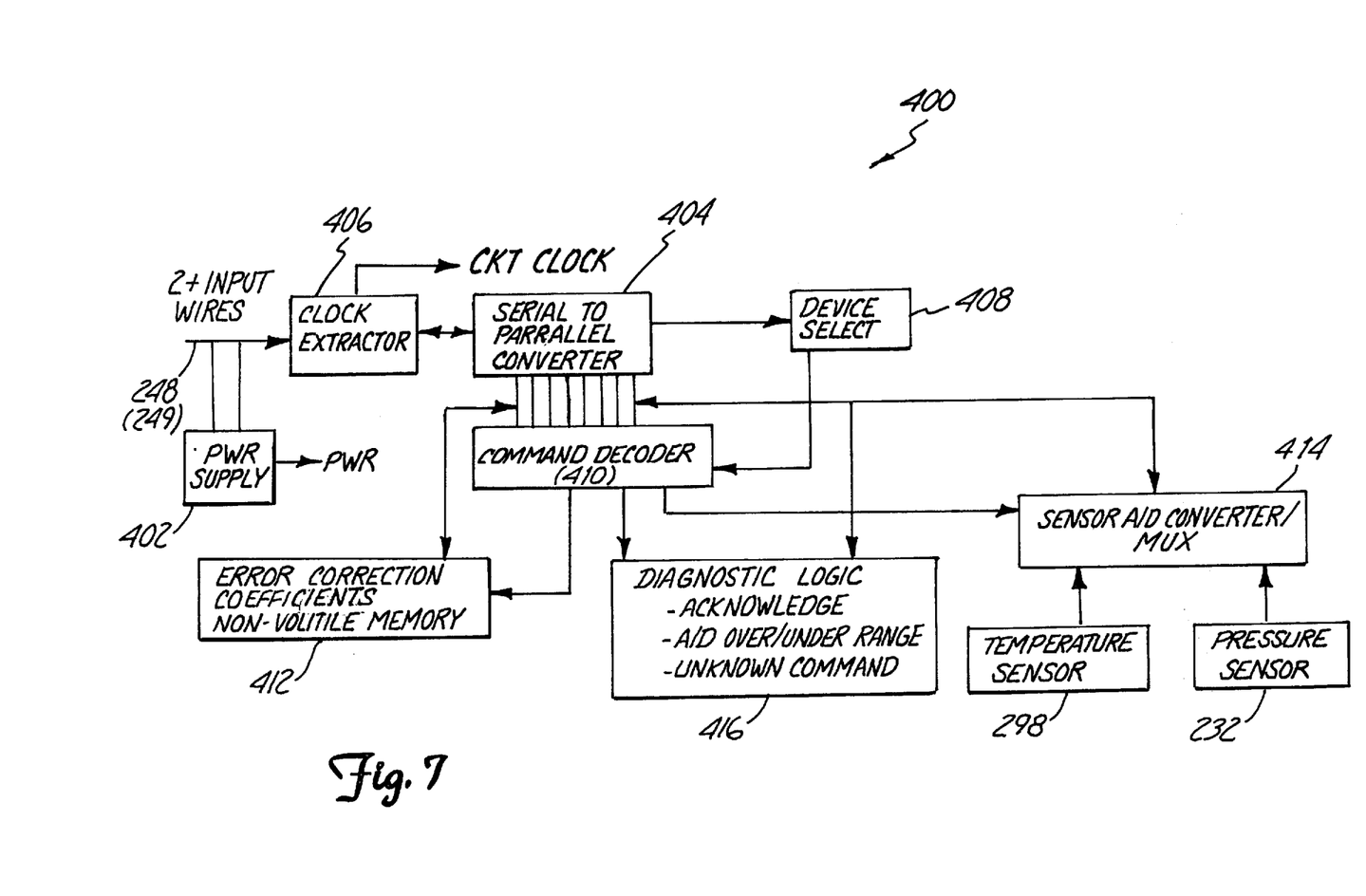
FIG. 7 is a simplified block diagram of a slave unit in accordance with another embodiment.

FIG. 7 is a simplified block diagram of remote module circuitry 400 for use in units 214,214' which does not include a microprocessor, in accordance with another embodiment. Circuitry 400 is well suited for being solely powered by master transmitter 260 shown in FIG. 3 which itself is solely powered over two-wire process control loop 228. Circuitry 400 couples to link 248 which, in one embodiment, comprises a two-wire circuit. Link 248 connects to power supply circuitry 402 which provides a power output to power circuitry 400. As a simple example, power supply circuitry 402 may be a single capacitor to filter DC signals carried on link 248. In the embodiment of FIG. 7, link 248 carries power, digital information and a clock signal. Link 248 connects to serial-to-parallel converter 404 through clock extractor 406 which provides a clock output signal for circuitry 400. Serial-to-parallel converter 404 connects to device select circuitry 408 and command decoder circuitry, 410, error correction coefficients nonvolatile memory 412 and analog-to-digital converter/MUX 414. Command decoder 410 couples to memory 412, A/D converter 414 and diagnostic logic 416. A/D converter couples to temperature sensor 298 and pressure sensor 232.

In operation, microprocessor 314 communicates with circuitry 400 as a simple I/O data port. Data is transmitted and received over link 248. Additionally, a clock signal and power are supplied over link 248. Clock extractor 406 provides a clock output used to clock circuitry 400. Device select circuitry 408 activates command decoder 410 such that circuitry 400 may be addressed. This is particularly useful if a number of circuits 400 are connected in series on bus 249.

Command decoder 410 is preferably a programmable logic array which recognizes a limited number of commands including: initiate pressure measurement, initiate temperature measurement, export results of last pressure measurement, export results of last temperature reading, export correction co-efficient information from memory 412, initiate diagnostic check and export diagnostic result, and import correction co-efficient information for storage in memory 412. Command controller 410 can therefore selectively couple analog-to-digital converter 414 to sensor 418 or 420 whose output is then placed in serial-to-parallel converter 404 for transmission over link 248. Furthermore, simple diagnostics are performed by diagnostic logic 414 such as out of range warnings, unknown command, command acknowledgement, etc. and the result of such diagnostic is provided to master transmitter 260 through converter 404. Device specific information may be stored in memory 412 (such as error correction co-efficients) and transmitted to master transmitter 260. As circuitry 400 does not require a microprocessor, the design offers increased communication reliability, reduced power consumption and reduced cost.

In one embodiment, in order to meet power requirements for powering the entire measurement system from a 4–20 mA current loop, the maximum power available on link 248 should not exceed 12 mW. As discussed above, circuitry 400 may be connected in series or in parallel with transmitter 260 and other circuits 400 through bus 249. One aspect of the invention includes using an optical bus in which information and power is transmitted optically. Further, although FIG. 7 shows data transmitted on bus 249 in a digital format, bus 249 may also carry analog signals instead of, or in addition to, digital signals. Unit 400 does not require an analog-to-digital converter and such conversion may take place in master transmitter 260. Typically, in the embodiment of FIG. 7, only a single microprocessor is used and it is located in master transmitter 260.

Circuitry 250 also provides various alarms. Circuitry 250 sends a "HI" alarm condition signal to control unit 230 by causing the signal on wires 228 to exceed a normal range and sends a "LO" alarm condition signal by causing the signal to fall below a normal range. The alarm can be triggered by circuitry 250 for a number of conditions including the occurrence of P1, P2 or ΔP falling outside of a predetermined range. This information is used to set a warning condition by forcing the loop current to a saturated high or low value. Other parameters could be examined for warning conditions, such as density.

Another aspect of the invention includes operation in an explosive environment or instances in which all devices must operate in accordance with intrinsic safety requirements. In the present invention, the master transmitter may be placed away from sensors in a non-intrinsically safe area. Thus, costs may be reduced during design and manufacture of the master transmitter because it does not need to be intrinsically safer or explosion proof. Intrinsic safety standards relate to designing and certifying equipment such that it is unable to produce a spark of sufficient energy to ignite a hydrogen atmosphere in a defined zone around the equipment. Explosion proof units are designed such that they will not explode even if the unit produces a spark of any magnitude within the unit. The embodiment of FIG. 3 is particularly advantageous for use in such instances as only units 214, 214' need be located near the process thereby limiting the number of components required to meet intrinsic safety requirements.

In one embodiment of the invention, the master unit measures differential pressure across an orifice in a flow tube using two slave units while a third slave unit is positioned along the flow tube, upstream or downstream from the orifice and measures absolute process fluid pressure. This allows determination of mass flow. Additionally, any number of slave units with any type or types of process variable transducers may be coupled to the bus.

Although the present invention has been described with reference to preferred embodiments, workers skilled in the art will recognize that changes may be made in form and detail without departing from the spirit and scope of the invention. For example, in addition to temperature and pressure sensors, other sensors and sensor inputs can be used with the invention, such as pH, volumetric or mass flow, conductivity, or gas composition. Slave units can connect in series or in parallel through the bus. The master transmitter can perform diagnostics, for example by monitoring for failure of a slave unit or monitoring a noise on the bus or loss thereof.

The invention may be particularly advantageous when it is desirable to obtain process variables from two widely spaced apart locations, for example, differential pressure between the top and bottom of a tower. Furthermore, as the length of the bus is extended, power consumption will increase. Power consumption may be reduced by placing the master transmitter at a midpoint between the two slave units. Power consumption may also be reduced by coupling the slave units in parallel and only communicating and powering one unit at a time.

What is claimed is:

1. A pressure measurement transmitter for use in a process control system communicating with a control unit, comprising:

a transmitter housing having an electrical connection to receive first and second respective electrical signals related to a first and second pressure;

a first remote housing separated from the transmitter housing having a first pressure port therein;

a second remote housing separated from the transmitter housing and the first remote housing having a first pressure port therein;

a first and second pressure transducer disposed respectively in the first and second remote housing and providing respectively first and second transducer outputs indicative of pressure at the first and second pressure ports;

slave circuitry in the first and second remote housings coupled to the first and second respective transducer outputs responsively providing first and second non-fluidic transducer signals;

a non-fluidic communication link between the transmitter housing and the first and second remote housings for carrying the first and second non-fluidic pressure signal from the first and second remote housings to the electrical connection of the transmitter housing; and transmitter circuitry coupled to the control unit and disposed within the transmitter housing, the circuitry receiving the first and second non-fluidic transducer signal over the non-fluidic communication link, providing power to the slave circuitry over the communication link which wholly powers the slave circuitry and providing a transmitter circuitry output to the control unit over a two-wire process control loop as a function of the first and second transducer outputs wherein the transmitter and slave circuitry are wholly powered from the two-wire process control loop.

2. The measurement transmitter of claim 1 wherein the transmitter circuitry output comprises a signal indicative of a pressure difference between the first and second pressure ports.

3. The measurement transmitter of claim 1 wherein the non-fluidic communication link comprises one or more electrical conductors.

4. The measurement transmitter of claim 1 wherein the transmitter circuitry compares measured pressure with programmed limits and responsively provides an alarm output.

5. The measurement transmitter of claim 1 wherein the transmitter circuitry output is related to level.

6. The measurement transmitter of claim 1 wherein the transmitter circuitry output is related to flow.

7. The measurement transmitter of claim 1 wherein the transmitter circuitry performs diagnostics by monitoring noise in a signal from a slave unit.

8. The measurement transmitter of claim 1 including a third remote housing having a transducer for sensing a process variable and associated slave circuitry coupled to the communication link.

9. The measurement transmitter of claim 1 wherein at least one pressure transducer measures absolute pressure.

10. The measurement transmitter of claim 1 wherein at least one pressure transducer measures gauge pressure.

11. The measurement transmitter of claim 1 including a temperature sensor in a transducer housing for measuring a compensation temperature.

12. A pressure measurement transmitter in a two-wire process control loop, comprising:

a first transducer housing having a first pressure port and a first communication port;

a second transducer housing having a second pressure port and a second communication port;

a transmitter housing having a third communication port;

first and second pressure transducers disposed respectively in the first and second transducer housing and providing respectively first and second electrical outputs responsive to pressure at respectively the first and second pressure ports; and transmitter circuitry disposed in the transmitter housing and coupled to the first electrical output through the first communication port and to the second electrical output through the second communications port, the transmitter circuitry calculating a parameter related to pressures at the first and second pressure ports and providing a third electrical output indicative of the parameter and transmitting the calculated parameter over the two-wire process control loop through the third communication port, wherein the measurement transmitter is wholly powered from the two-wire process control loop.

13. The pressure measurement transmitter of claim 12 wherein the transmitter circuitry couples to the first electrical output via the first and second communication ports, and the transmitter circuitry provides the third electrical output via the third communication port.

14. The pressure measurement transmitter of claim 12 further including:
at least one conductor coupling the transmitter circuitry to the first pressure transducer.

15. The pressure measurement transmitter of claim 12 further including:
measurement circuitry disposed in the first and second transducer housings;
wherein the transmitter circuitry couples to the first electrical output via the measurement circuitry, and wherein the transmitter circuitry energizes the measurement circuitry.

16. The pressure measurement transmitter of claim 12 further including;
measurement circuitry disposed in the transducer housings including a memory storing coefficients used to compensate the first electrical output.

17. The pressure measurement transmitter of claim 12 including a third transducer housing having a transducer for sensing a process variable coupled to the transmitter circuitry.

18. The pressure measurement transmitter of claim 12 wherein at least one pressure transducer measures absolute pressure.

19. The pressure measurement transmitter of claim 12 wherein at least one pressure transducer measures gauge pressure.

20. The pressure measurement transmitter of claim 12 including a temperature sensor in a transducer housing for measuring a compensation temperature.

21. A system for measuring a process variable related to a pressure differential in an intrinsically safe area, the system comprising:
a first sensor unit including a first pressure sensor adapted to couple to the tank and responsively providing a first sensor signal related to a first pressure, and first conditioning circuitry coupled to the first sensor signal responsively providing a first unit output to a first unit connection which also receives power to wholly power the first sensor unit;
a second sensor unit including a second pressure sensor adapted to couple to the tank and responsively providing a second sensor signal related to a second pressure, and second conditioning circuitry coupled to the second sensor signal responsively providing a second unit output to a second unit connection which also receives power to wholly power the second sensor unit;
a bus coupled to the first and second unit connections which wholly powers the first and second sensor units and carries the first and second unit outputs; and
a master transmitter connected to the bus to provide the power to the first and second units and adapted to be connected to a two-wire process control loop which wholly powers the transmitter and thereby the first and second sensor units, wherein the bus provides a non-fluid connection between the transmitter and the first and second units, the transmitter including transmitter circuitry which transmits a transmitter signal related to the process variable on the two-wire process in response to the first and second unit outputs received through the bus.

22. The system of claim 21 wherein the bus provides an electrical connection between the transmitter and the first and second units.

23. The system of claim 21 wherein the bus provides an optical connection between the transmitter and the first and second units.

24. The system of claim 21 wherein the first and second unit outputs are analog signals.

25. The system of claim 21 wherein the first and second conditioning circuitry include first and second respective analog-to-digital converters and the first and second unit outputs are digitally encoded.

26. The system of claim 21 wherein the first and second units are connected in series by the bus.

27. The system of claim 21 wherein the first and second units are connected in parallel by the bus.

28. The system of claim 21 wherein the power provided to the first sensor unit is less than about 12 mW and the power provided to the second sensor unit is less than about 12 mW.

29. The system of claim 21 wherein the first sensor unit includes a temperature sensor and the first unit output is related to temperature sensed by the temperature sensor.

30. The system of claim 29 wherein the first conditioning circuitry in the first sensor unit conditions the first sensor signal in response to temperature sensed by the temperature sensor.

31. The system of claim 29 wherein the transmitter circuitry compensates the transmitter output in response to temperature sensed by the temperature sensor.

32. The system of claim 21 including a single microprocessor, wherein the single microprocessor is located in the transmitter.

33. The system of claim 21 including a microprocessor located in the first sensor unit.

34. The system of claim 21 wherein the process control loop is a 4–20 mA process control loop and the transmitter signal is represented by a current level between 4 mA and 20 mA carried on the process control loop.

35. The system of claim 21 wherein the process control loop carries Fieldbus® signals thereon.

36. The system of claim 21 wherein the process control loop carries HART® signals thereon.

37. The system of claim 21 wherein the first conditioning circuitry provides the first unit output in response to an interrogation signal received from the transmitter over the bus.

38. The system of claim 21 wherein the transmitter circuitry output is related to level.

39. The system of claim 21 wherein the transmitter circuitry output is related to flow.

40. The system of claim 21 including a third pressure sensor unit having a transducer for sensing a process variable and associated conditioning circuitry coupled to the bus.

41. The system of claim 21 wherein the transmitter circuitry performs diagnostics on signals received from the bus.

42. The system of claim 21 wherein at least one pressure sensor measures absolute pressure.

43. The system of claim 21 wherein at least one pressure sensor measures gauge pressure.

* * * * *